United States Patent [19]
Lawton, Jr. et al.

[11] Patent Number: 5,934,078
[45] Date of Patent: Aug. 10, 1999

[54] RECIPROCATING ACTIVE MAGNETIC REGENERATOR REFRIGERATION APPARATUS

[75] Inventors: Lewis M. Lawton, Jr., Barrington, Ill.; Carl B. Zimm, Madison; Alexander G. Jastrab, Cambridge, both of Wis.

[73] Assignee: Astronautics Corporation of America, Milwaukee, Wis.

[21] Appl. No.: 09/018,153

[22] Filed: Feb. 3, 1998

[51] Int. Cl.[6] ...................................................... F25B 21/00
[52] U.S. Cl. .................................................. 62/3.1; 62/467
[58] Field of Search ........................................ 62/3.1, 467

[56] References Cited

U.S. PATENT DOCUMENTS

| | | |
|---|---|---|
| 4,332,135 | 6/1982 | Barclay et al. . |
| 4,408,463 | 10/1983 | Barclay . |
| 4,459,811 | 7/1984 | Barclay et al. . |
| 4,507,927 | 4/1985 | Barclay . |
| 4,507,928 | 4/1985 | Johnson . |
| 4,702,090 | 10/1987 | Barclay et al. . |
| 4,704,871 | 11/1987 | Barclay et al. . |
| 4,727,721 | 3/1988 | Peschka et al. . |
| 5,091,361 | 2/1992 | Hed . |
| 5,182,914 | 2/1993 | Barclay et al. . |
| 5,249,424 | 10/1993 | DeGregoria et al. . |
| 5,332,029 | 7/1994 | Tokai et al. . |
| 5,381,664 | 1/1995 | Bennett et al. ............................. 62/3.1 |
| 5,444,983 | 8/1995 | Howard ...................................... 62/3.1 |
| 5,447,034 | 9/1995 | Kuriyama et al. . |
| 5,743,095 | 4/1998 | Gschneidner, Jr. et al. ............... 62/3.1 |

OTHER PUBLICATIONS

K.A. Gschneidner, Jr., "Magnetic Refrigeration," in *Rare Earths: Science, Technology and Applications III*, The Minerals, Metals and Materials Society, 1997, pp. 209–221.

A.J. DeGregoria, et al., "Test Results of an Active Magnetic Regenerative Refrigerator," Advances in Cryogenic Engineering, vol. 37B, 1991, and Cryogenic Engineering Conf. 1991, Jun. 11–14, 1991 Huntsville, Alabama.

A.J. DeGregoria, "Modeling the Active Magnetic Regenerator," Advances in Cryogenic Engineering, vol. 37B, 1991, and Cryogenic Engineering Conf., 1991, Jun. 11–14, 1991, Huntsville, Alabama.

C.R. Cross, et al., "Optimal Temperature–Entropy Curves for Magnetic Refrigeration," Advances in Cryogenic Engineering, vol. 33, pp. 767–776, 1988, and Cryogenic Engineering Conference, Jun., 1987.

L.D. Kirol, et al., "Rotary Recuperative Magnetic Heat Pump," in Advances in Cryogenic Engineering, 1988.

"The Big Chill . . . Magnetic Refrigeration Technology Makes a Cool Debut," the "Insider," Ames Laboratory, Department of Energy, Ames, Iowa, Feb., 1997.

"New Fridge Technology on the Horizon," The Capital Times, Feb. 21, 1997.

*Primary Examiner*—Christopher B. Kilner
*Attorney, Agent, or Firm*—Foley & Lardner

[57] ABSTRACT

An active magnetic regenerator refrigeration apparatus includes one or more reciprocating regenerator beds and a heat transfer fluid distribution valve that is activated as the bed is moved between a position in which it is in the magnetic field of a magnet to a position in which it is outside the magnetic field of the magnet. The distribution valve has a first valve member and a moving second valve member slidingly engaged to each other, each of which has ports by which heat transfer fluid may be provided to and received from the valve member. The bed is mounted to the moving second valve member so that heat transfer fluid is conveyed to and through the valve in a single direction into the regenerator bed. The material of the bed exhibits the magnetocaloric effect and the temperature of the bed rises when it enters the magnetic field of the magnet and decreases when it exits the magnetic field, providing a refrigeration cycle. The direction of fluid flow to, from and through the distribution valve remains the same in both positions of the bed or beds, with the distribution valve serving to switch the direction of the fluid flow through the bed in the unmagnetized and magnetized positions of the bed, so that there is essentially no dead volume of heat transfer fluid.

56 Claims, 8 Drawing Sheets

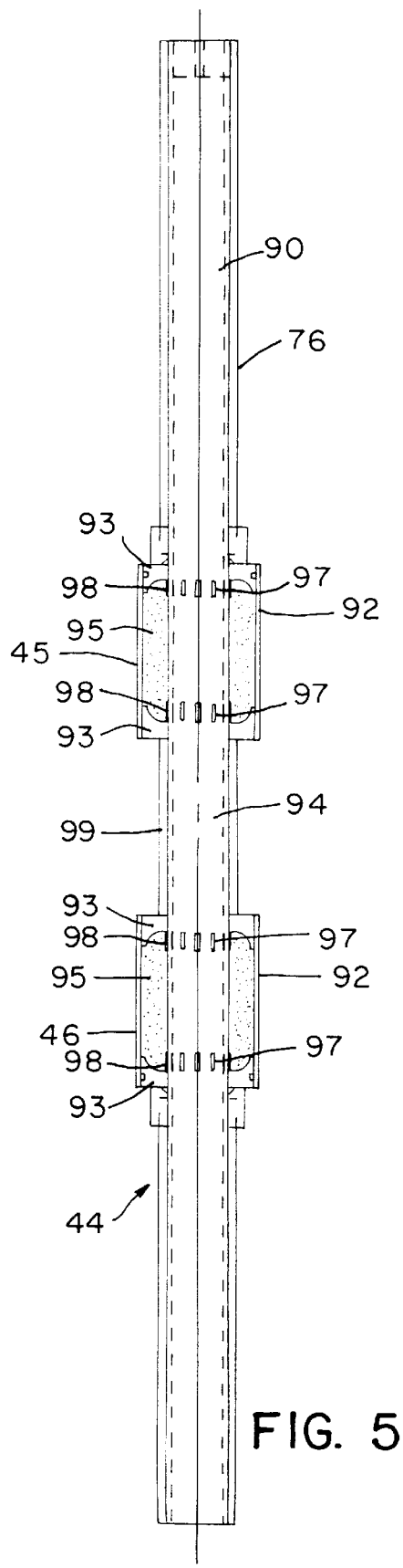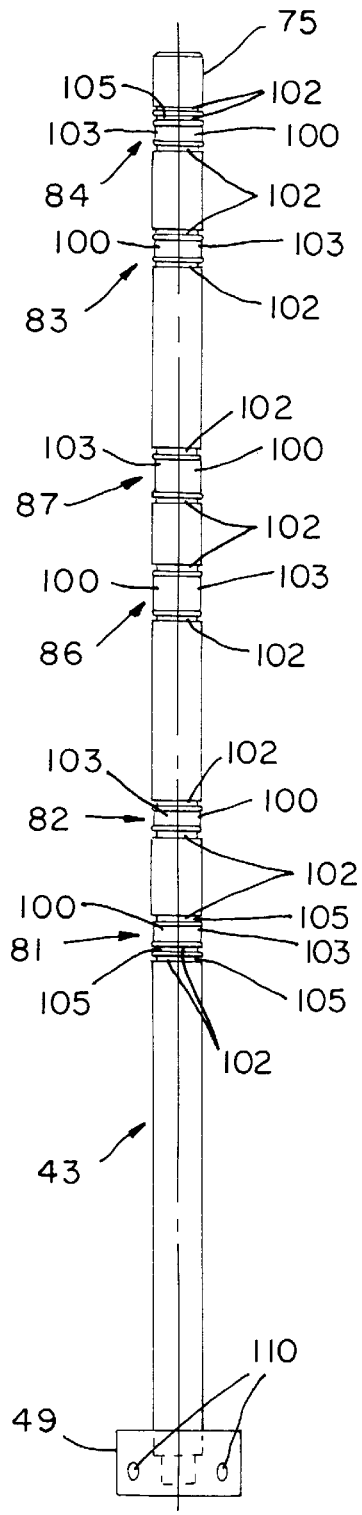
FIG. 5
FIG. 6

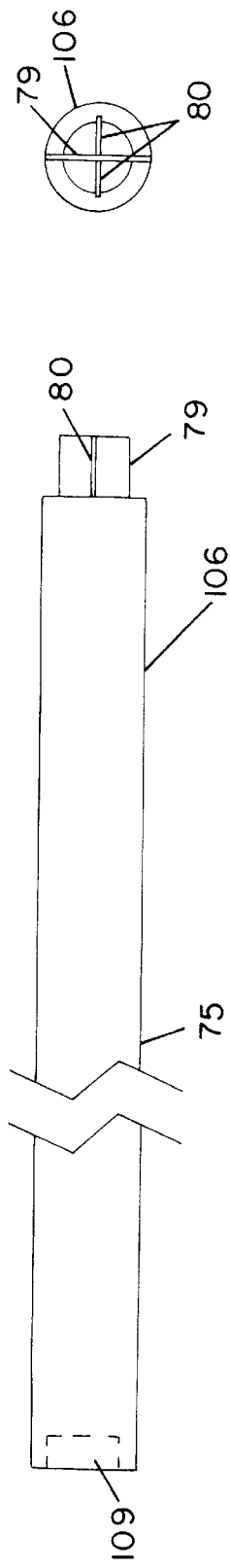
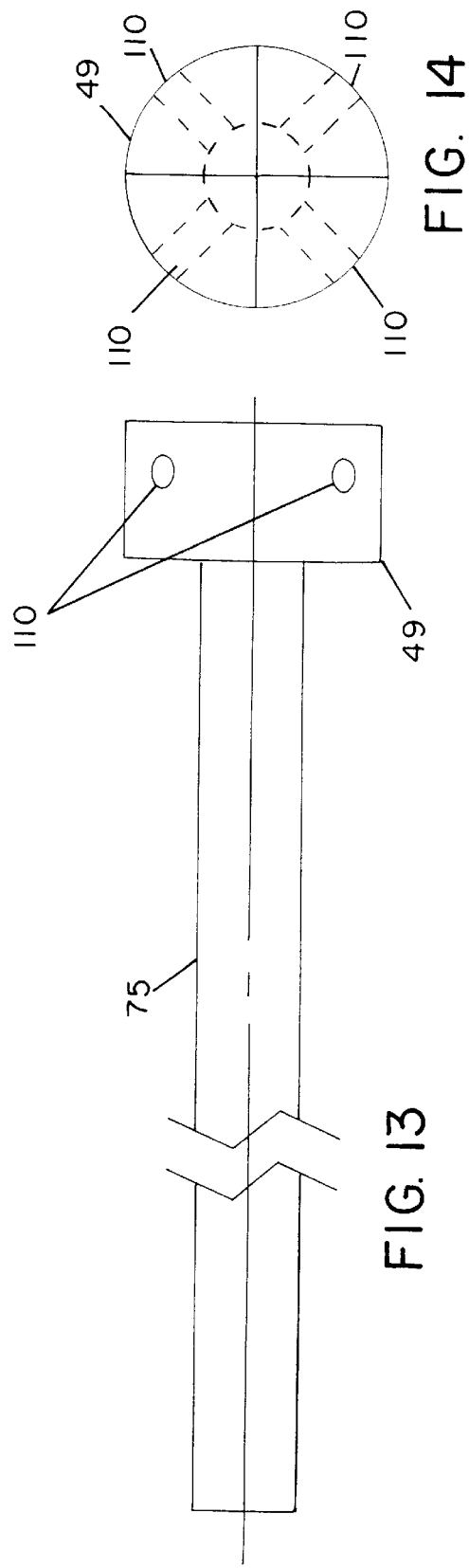

RECIPROCATING ACTIVE MAGNETIC REGENERATOR REFRIGERATION APPARATUS

FIELD OF THE INVENTION

This invention pertains generally to the field of magnetic refrigeration and particularly to active magnetic regenerative refrigeration apparatus.

BACKGROUND OF THE INVENTION

Active magnetic regeneration combines a regenerator with a device which operates on the magnetocaloric effect. The operation of active magnetic regenerators is described in U.S. Pat. No. 4,332,135 to Barclay, et al. An experimental model of an active magnetic regenerator has been built and tested and is described in an article by A. J. DeGregoria, et al., "Test Results of An Active Magnetic Regenerative Refrigerator," Advances in Cryogenic Engineering, Vol. 37B, 1991. A detailed model of the active magnetic regenerator is given in an article by A. J. DeGregoria, Advances in Cryogenic Engineering, Vol. 37B, 1991.

An active magnetic regenerator is a type of cooler or heat pump which utilizes the magnetocaloric effect. Materials which exhibit the magnetocaloric effect warm upon magnetization and cool upon demagnetization, or vice versa. In a basic active magnetic regenerator (AMR) device, a bed of magnetic material which is porous to a heat transfer fluid is located between two heat exchangers, with a mechanism provided for effecting reciprocating fluid flow through the bed of magnetic material from one heat exchanger to the other. A mechanism is also provided for magnetizing and demagnetizing the bed. There are four parts to an AMR cycle: bed magnetization, which warms the magnetic material and the fluid in the bed by the magnetocaloric effect; cold side to hot side fluid flow through the bed with release of heat through a hot side heat exchanger; bed demagnetization, cooling the magnetic material and the fluid in the bed; and hot side to cold side fluid flow through the bed, with the cooled fluid absorbing heat at the cold side heat exchanger.

An AMR device is an extension of the regenerator concept. A regenerator is used to recover heat when fluid is exchanged in a reciprocating fashion between two reservoirs of different temperatures. The regeneration cycle has two parts: flow from the cold reservoir to the hot reservoir through the bed, followed by a flow from the hot reservoir to the cold reservoir through the bed.

In a regenerator device, the shuttle fluid is the total fluid mass which flows in one direction prior to reversal. After many reciprocating flows of the shuttle fluid through the bed, the bed material establishes a temperature profile which increases from the side at which the cold fluid enters (the cold side) to the side at which the hot fluid enters (the hot side). During the flow from the cold side to the hot side, the fluid enters at a temperature $T_c$, the temperature of the fluid in the cold side reservoir. The shuttle fluid is warmed by the bed as it passes through the bed and leaves the bed at a temperature below $T_h$, the temperature of the hot side reservoir. During the flow from the hot side to the cold side, the fluid enters the bed at the temperature $T_h$, and is cooled by the bed as it passes through, leaving the bed at a temperature above $T_c$. Over the entire cycle, the bed theoretically receives no net heat. It acts as an intermediate heat reservoir, absorbing heat from the warm fluid and rejecting it to the cool fluid. The difference in temperature between the temperature at which the shuttle fluid enters the cold reservoir and the temperature $T_c$ of the cold reservoir fluid, $\Delta t$, represents heat flow from the hot reservoir to the cold reservoir. At worst, this difference would be $T_h-T_c$, which is the case if there is no regenerator present. The ratio of $\Delta t$ to $(T_h-T_c)$ is referred to as the regenerator ineffectiveness.

An AMR device magnetizes and warms the bed prior to fluid flow from cold to hot, and then demagnetizes and cools the bed prior to flow from the hot side to the cold side. The application of the magnetic field to the magnetized bed creates a pair of profiles of temperature and relative position in the bed, one when the bed is magnetized and the other when the bed is unmagnetized. The difference between the two bed profiles at any location is the adiabatic temperature change of the magnetic material in going through the change in magnetic field. If the adiabatic temperature change is large enough, the fluid emerging from the cold side of the bed can have a temperature which is lower than the temperature of the cold reservoir, resulting in net cooling of the cold reservoir, rather than a heat leak from the hot reservoir to the cold reservoir which would be the case with an ordinary regenerator. Of course, in accordance with the laws of thermodynamics, work must be done in such a process since heat is flowing from a cold to a hot reservoir. In the case of an AMR, the work is performed by the drive mechanism which moves the magnet and/or the bed relative to one another, or by the use of a rotating permanent magnet or an electrically switched magnet. By utilizing the heat exchangers at both the hot side and the cold side, heat can be removed from the cold side heat exchanger through the AMR and released through the hot side heat exchanger. A structure for accomplishing this transfer is disclosed in the aforesaid U.S. Pat. No. 4,332,135.

The AMR cycle described above is similar to the Brayton cycle for a gas refrigerator in that the magnetization and demagnetization (work input) parts of the cycle are done at constant entropy, i.e., without fluid flow and heat transfer. In a magnetic analogue of the Ericsson cycle, the change in field is done at constant bed material temperature, which requires heat transfer during the magnetization and demagnetization processes. Cycles intermediate between the Brayton and Ericsson can also be performed, which are characterized by an amount of heat transfer during magnetization intermediate between the amounts required by Brayton and Ericsson cycles. AMR cycles which are analogous to Ericsson and intermediate cycles may be performed by allowing some fluid flow in the bed material during the magnetization and demagnetization process.

A further extension of active magnetic regenerators is shown in U.S. Pat. No. 5,249,424 to DeGregoria, et al., in which the flow of heat transfer fluid through the bed is unbalanced so that more fluid flows through the bed from the hot side to the cold side of the bed than from the cold side to the hot side. The excess heat transfer fluid is diverted back to the hot side of the bed, and multiple stages of active magnetic regenerators may be used. As described in this patent, the regenerator beds may be moved in and out of the magnetic field either in a reciprocating fashion or the beds may be mounted in a rotating wheel.

One of the disadvantages of active magnetic regenerators is the inefficiency encountered because the heat transfer fluid in reciprocating active magnetic regenerators is shuttled back and forth between the regenerator bed(s) and the respective hot and cold heat exchangers. Because the flow of fluid is not in a single direction between the beds and the heat exchangers, some amount of the heat transfer fluid is always in the connecting lines between the beds and the heat exchangers and never cycles both through the beds and the heat exchangers. This trapped heat transfer fluid, commonly referred to as the "dead volume," is a significant source of inefficiency in previous active magnetic regenerators.

In conventional gas cycle refrigerators, many of the most common and economically suitable refrigerants, such as chlorofluorocarbons, are environmentally hazardous. In magnetic refrigerators, including active magnetic regenerators, the working material is a solid, and a separate fluid is used to convey heat to and from the heat exchangers. Because the heat transfer fluid does not need to undergo compression and expansion, any fluid having acceptable heat capacity and flow characteristics over the temperature range of the refrigerator can be used.

SUMMARY OF THE INVENTION

In accordance with the present invention, an active magnetic regenerator refrigeration apparatus incorporates a reciprocating regenerator bed and a heat transfer fluid distribution valve that is activated as the regenerator bed is moved between a position in which the bed is in the magnetic field of a magnet to a position in which it is outside the magnetic field of the magnet. The distribution valve has a normally stationary first valve member and a moving second valve member slidably engaged to one another, each of which has ports by which heat transfer fluid may be provided to and received from the valve member. The bed is mounted to the moving second valve member in communication with the ports in the moving second valve member so that the heat transfer fluid is conveyed to and through the valve in a single direction and exits the valve through the ports in the moving second valve member directly into the regenerator bed. The direction of fluid flow to, from and through the valve remains the same in both positions of the bed, with the valve switching the direction of the fluid flow through the bed in the magnetized and unmagnetized positions of the bed. The efficiency of the regenerator apparatus of the invention is thus greatly increased because there is essentially no dead volume of heat transfer fluid.

The active magnetic regenerator refrigeration apparatus of the present invention preferably includes hot and cold heat exchangers, conduits connecting the hot and cold heat exchangers to the distribution valve on which the regenerator bed is mounted, and a pump for driving the heat transfer fluid through the heat exchangers and to and from the valve. A reciprocating drive, such as a piston air cylinder, is connected to the distribution valve to drive the valve between its two positions and to move the regenerator bed between its two positions. Preferably, two regenerator beds are mounted to the distribution valve, so that one bed is in the field of the magnet at each terminal position of the valve while the other bed is out of the magnetic field. If desired, the apparatus may include more beds that are moved together, for example, four beds and two magnets (two beds per magnet), with an attendant increase in cooling power. The distribution valve switches the direction of fluid flow through the bed or beds so that the heat transfer fluid that has flowed through the bed that is in the magnetic field passes first through the hot heat exchanger and thence to the bed which is outside of the magnetic field. The fluid that passes through the bed that is outside the magnetic field is directed by the distribution valve to the cold heat exchanger and thence back to the bed that is in the magnetic field. The pump is connected in the conduits to maintain the flow in a continuous loop through the various components of the apparatus. When the beds are moved between their two positions, the pump is preferably turned off or bypassed so that no fluid flows until the beds are into their terminal positions (for a Brayton-type cycle), at which the distribution valve changes the direction of flow of the fluid through each bed while maintaining the single direction of flow of heat transfer fluid in all places outside of the beds to minimize the dead volume of heat transfer fluid. It may be in some cases desirable to execute a cycle intermediate between the Brayton and Ericsson cycles which requires heat transfer fluid flow during the initial or final parts of the bed demagnetization or magnetization process. This may be accomplished by keeping the ports in the normally stationary first valve member and the moving second valve member aligned by allowing the first valve member to follow the motion of the second valve member for a limited distance.

The self-activating distribution valve may include a moving second valve member formed of an outer tube on which are mounted the two regenerator beds at positions spaced from one another, and a first member formed of an inner tube having an outside diameter smaller than, but closely matching the inside diameter of, the outer tube. The reciprocating drive is connected to the outer tube to move it in reciprocating motion. The inner tube has a hollow lumen which is divided by walls into four quadrant conduits (for two beds; two half conduits may be used for one bed), and the four quadrant conduits communicate with four ports of the first valve member. The external conduits extending to the heat exchangers and the pump are connected to these ports to supply heat transfer fluid to or receive heat transfer fluid from each of the four quadrant conduits of the inner tube. The cylindrical wall of the inner tube has spaced pairs of openings therein which communicate with respective ones of the four quadrant conduits into which the lumen of the inner tube is divided. For two beds there are three pairs of equally spaced openings in the inner tube, with the three pairs of openings positioned at dwell positions of the beds. Two of the pairs of openings are at positions outside of the magnetic field of the magnet, and the openings of one of the pairs are within the magnetic field of the magnet. The outer tube has pairs of ports therein extending through the wall of the tube to a bed, which is preferably formed as a cylindrical casing mounted to the outer tube. The casing is filled with the material exhibiting the magnetocaloric effect, with the ports in the outer tube extending to the regenerator bed at positions near the two ends of the cylindrical casings for the beds. Seals are engaged between the inner and outer tubes to prevent flow of heat transfer liquid from or to the beds except when the openings in the outer tube align with the openings in the inner tube. These seals may be formed as rings extending between the inner and outer tubes, yielding simple, durable and reliable sliding seals.

Preferably, the two pairs of openings in the normally stationary inner tube that are located at positions outside of the magnetic field of the magnet open to the same two quadrant conduits of the lumen. These two conduits extend to two ports of the first valve member. A conduit extends from one of these ports to the cold heat exchanger to provide heat transfer fluid on a path from the bed through the conduit to the cold heat exchanger, while the other of these ports is connected by a conduit to the hot heat exchanger to supply fluid from the hot heat exchanger through the conduit and the quadrant conduit to the bed. The other two pairs of openings in the inner tube, which are positioned within the magnetic field, open into the other two quadrant conduits, with one of the quadrant conduits extending to a port which is connected by a conduit to provide heat transfer fluid from the bed, when it is within the magnetic field, to the hot heat exchanger, and the other quadrant conduit extending to a port which is connected to a conduit to receive fluid from the cold heat exchanger. In this manner, the bed which is positioned within the magnetic field will receive heat transfer fluid from the cold heat exchanger, which will pass through the bed in one direction, be directed out through the other opening in the outer tube, and thence pass through a quadrant conduit, out of a port of the first valve member and, via an external conduit, to the hot heat exchanger.

The material in the regenerator bed exhibits the magnetocaloric effect. Thus, the material of the bed rises in temperature when it enters the magnetic field. The heat transfer fluid passing through the bed that is in the magnetic field receives heat from the regenerator bed material, this heat is transferred to the hot heat exchanger by the heat transfer fluid, and the hot heat exchanger removes heat from this fluid so that the fluid exiting the hot heat exchanger is at a lower temperature. The magnetocaloric material in the bed that is outside the magnetic field has decreased in temperature when it was moved out of the magnetic field. It receives heat transfer fluid from the hot heat exchanger at a temperature which is higher than the temperature of the regenerator bed at that time. The regenerator bed thus absorbs heat from the heat transfer fluid, and the fluid exiting the bed is at a lower temperature than the fluid that entered the bed. This fluid then exits from the distribution valve to the cold heat exchanger where the heat transfer fluid picks up heat from the material to be cooled (e.g., the interior of a cold storage refrigerator), and increases in temperature. The heat transfer fluid exiting the cold heat exchanger then passes back on a conduit to a port of the distribution valve, where it is directed by a quadrant conduit in the distribution valve to the regenerator bed that is within the magnetic field, with this heat transfer fluid thus picking up heat from the regenerator bed as it passes through the bed.

As the heat transfer fluid passes through the two beds, the temperature of the magnetocaloric material within the bed that is in the magnetic field will decrease in temperature (while maintaining a gradient in temperature: increasing from the inlet side of the bed to the outlet side), and the temperature of the magnetocaloric material within the bed outside the magnetic field will increase in temperature (while maintaining a gradient in temperature: declining from the inlet side of the bed to the outlet side of the bed).

To do the work required to achieve refrigeration, after a selected dwell time at a terminal position, the reciprocating drive then moves the distribution valve and the beds to the opposite terminal position so that the one bed that was in the magnetic field is outside the magnetic field and the other bed that was outside the magnetic field is now inside the magnetic field. The distribution valve now again supplies fluid to the two regenerator beds, with directions of fluid flow that are opposite to the directions of fluid flow through the beds in their previous positions to maintain the temperature gradient within the beds and to achieve regenerating action. The magnetocaloric material in the bed that was in the magnetic field decreased in temperature as it was moved out of the magnetic field. This bed now receives heat transfer fluid from the hot heat exchanger; this fluid enters at the side of the bed that is at the warmest temperature and exits at the side of the bed that is at the coolest temperature. While a gradient in temperature from one end of the bed to the other is maintained when the bed is moved from within the magnetic field to outside the magnetic field, the temperature of the magnetocaloric material at all positions in the bed declines. Similarly, for the bed that is moved from outside the magnetic field to within the magnetic field, the gradient in temperature between the two ends of the bed is maintained but the temperature of the material at all positions in the bed is raised.

The magnet is preferably a solenoidal magnet having a cylindrical interior axially aligned with the first valve member and the moving second valve member of the distribution valve. The magnet may be an electromagnet connected to an electrical source, a superconducting magnet maintained within a dewar and in a liquid refrigerant bath, if necessary, or a strong permanent magnet.

For operation of the present invention at or near room temperature—for example, to operate a refrigerator that maintains the interior of the refrigerator at near freezing temperatures—the heat transfer fluid may be water or water/anti-freeze mixtures. The use of water, a buffered water solution, or water/anti-freeze materials as a heat transfer fluid is highly desirable because such materials are inexpensive, readily available, and present minimal environmental hazards.

Further objects, features and advantages of the invention will be apparent from the following detailed description when taken in conjunction with the accompanying drawings.

BRIEF DESCRIPTION OF THE DRAWINGS

In the drawings:

FIG. 5 is a cross-sectional view of the moving second valve member of the distribution valve and the magnetic regenerator beds mounted thereto.

FIG. 6 is an external view of the first valve member of the distribution valve.

FIGS. 7–14 are simplified views showing a preferred manner of construction of the divided lumen inner tube of the first valve member of the distribution valve.

DETAILED DESCRIPTION OF THE INVENTION

Figure 1:
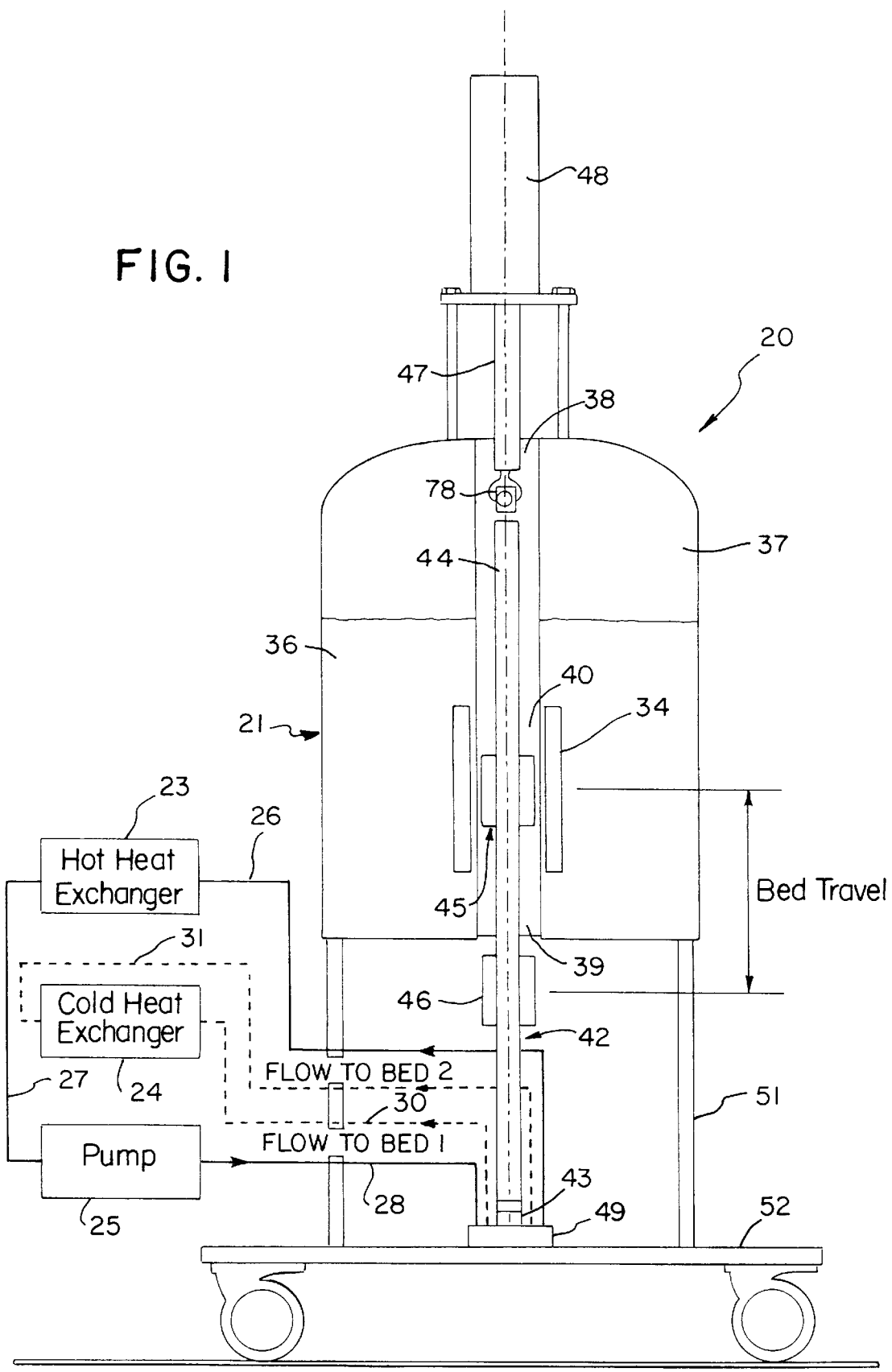
FIG. 1 is a simplified schematic view of the active magnetic regenerator refrigeration apparatus in accordance with the invention.

With reference to the drawings, an active magnetic regenerator refrigeration apparatus in accordance with the invention is shown generally at 20 in FIG. 1. The apparatus 20 includes an active magnetic regenerator 21 to which are connected a hot heat exchanger 23, a cold heat exchanger 24, and a pump 25. The apparatus 20 removes heat from a refrigeration load, e.g., a fluid or an enclosed space, by means of the cold heat exchanger 24, and rejects heat from the apparatus by means of the hot heat exchanger 23. Heat transfer fluid flows from the active regenerator 21 at a high temperature to the hot heat exchanger 23 through a conduit 26, e.g., a metal pipe; the fluid then passes through the hot heat exchanger 23 (and consequently is lowered in temperature), through a conduit 27 to the pump 25, and thence from the pump through a conduit 28 back to the active regenerator 21. Similarly, heat transfer fluid at a low temperature passes from the active regenerator 21 through a conduit 30 to the cold heat exchanger 24; the heat transfer fluid that has passed through the cold heat exchanger (and thus is at a higher temperature than the fluid in the conduit 30) is passed through a conduit 31 back to the regenerator 21. The temperature of the heat transfer fluid in the conduits 26, 27 and 28 will generally be higher than ambient so that no insulation is required for these conduits. However, the temperature of the heat transfer fluid in the conduits 30 and 31 will generally be lower than ambient, so that heat insulation around these conduits may be utilized to increase the overall efficiency of the apparatus.

The magnetic field for the active magnetic regenerator 21 is provided by, for example, a superconducting solenoid magnet coil 34 formed in a conventional manner of a wound superconductor, such as niobium-titanium or niobium-tin. To maintain the solenoid coil 34 in a superconducting state, the coil is immersed in a bath 36 of liquid helium or liquid hydrogen held within a dewar 37 in a standard manner. The coil 34 can also be cooled using a suitable cryocooler. Such superconducting magnets and their associated dewars are well-known and are used in a variety of commercial equipment, such as magnetic resonance imaging apparatus. The dewar 37 has a central cylindrical opening 38 extending through the center of the dewar, which is defined by a cylindrical, insulated inner wall 39. The solenoidal coil 34 extends around and is closely adjacent to the wall 39. The coil 34 thus provides a strong magnetic field that extends through the interior of the solenoid coil and thus through a section, indicated generally at 40, within the hollow central opening 38 of the dewar.

A portion of a distribution valve 42 is positioned within the central opening 38. The valve 42 has a first valve member 43 and a moving second valve member 44 slidingly engaged to one another. The first valve member 43 is normally fixed in position and stationary for a Brayton refrigeration cycle, but may be mounted for a short range of sliding movement where a cycle intermediate between a Brayton and Ericsson cycle is desired. A first regenerator bed 45 and a second regenerator bed 46 are mounted to the moving second valve member 44. The moving second valve member 44 of the distribution valve 42 is connected by a shaft 47 to a drive 48, such as an air cylinder, although any suitable drive, such as a hydraulic cylinder, electric motor, etc. may be utilized. The drive 48 operates to reciprocate and switch the positions of the distribution valve 42 and to move the beds 45 and 46 between two terminal positions. In the first terminal position, illustrated in FIG. 1, the first or upper bed 45 is within the space 40 in the magnetic field from the solenoid 34 while the second or lower bed 46 is well outside of the magnetic field from the solenoid. In the second position, the moving second valve member 44 and the beds 45 and 46 are drawn upwardly by the drive 48 so that the second bed 46 is in the space 40 within the magnetic field from the solenoid 34, while the first bed 45 is elevated above the solenoid 34 and is outside of its magnetic field. The first valve member 43 of the distribution valve 42 is connected at its bottom to a manifold 49 to which are connected the conduits 26, 28, 30 and 31. For purposes of illustration, the dewar 37 and the drive 48 supported on it are shown mounted on legs 51 attached to a wheeled mobile platform 52. The manifold 49 is secured to the platform 52. However, it is apparent that the active regenerator 21 may be mounted directly on a solid floor or on any other suitable surface, and that the distribution valve 42 and the drive 48 may be oriented other than vertically, e.g., horizontally, with appropriate sliding mounts and supports for the valve, if desired.

It is also understood that the superconducting solenoid 34 used to provide the magnetic field is shown for purposes of exemplification only, and the present apparatus may be utilized with other magnets, e.g., electromagnets provided with electrical power, or permanent magnets, and that appropriate high temperature superconducting solenoids may also be utilized as practical high temperature superconducting solenoids become available. The use of a superconducting solenoid is desirable both to produce a very high magnetic field within the space 40, e.g., in the range of 1 Tesla to 5 Teslas or higher, and because very little energy input is required after the solenoid is charged up to maintain the current flowing in the solenoid and thus maintain the magnetic field. The cost of replenishing the cryogenic coolant 36—e.g., liquid helium or hydrogen for a low temperature superconductors or liquid nitrogen for high temperature superconductors—while reducing somewhat the total efficiency, is nonetheless offset by the high efficiency of the refrigeration process utilizing the active regenerator 21 with a strong magnetic field. For non-commercial applications, a permanent magnet is well suited to provide the magnetic field, rather than the superconducting solenoid 34, with a corresponding somewhat lower efficiency of refrigeration per cycle of the beds 45 and 46 into and out of the magnetic field—i.e., more cycles of the beds into and out of the field are required to achieve the same refrigeration with a weaker field magnet than would be required with a stronger field magnet.

Figure 2:
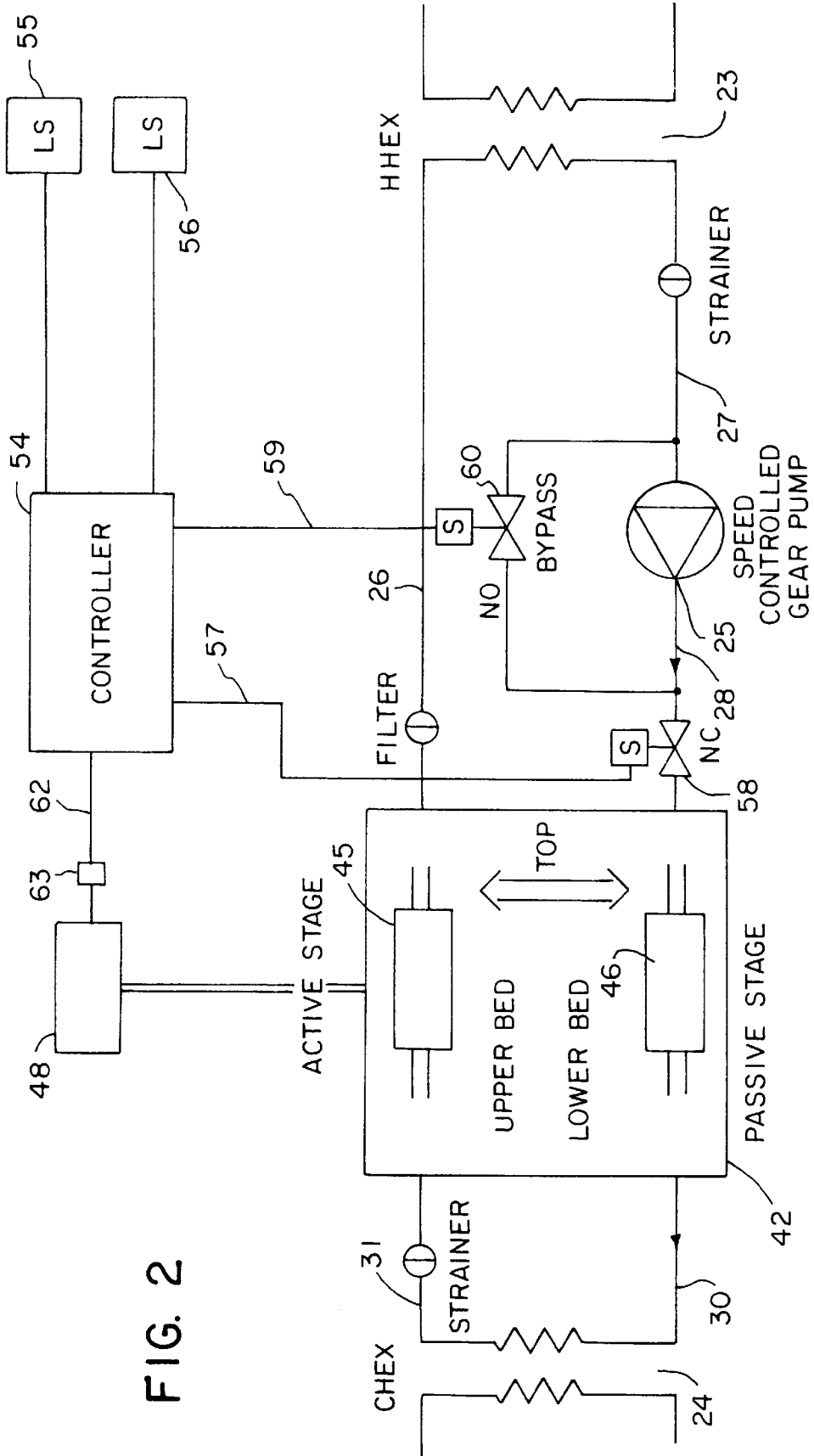
FIG. 2 is a fluid flow schematic for a refrigeration system incorporating the refrigeration apparatus of the invention.

An example of a refrigeration system with which the active magnetic regenerator refrigeration apparatus 20 may be used is shown in a schematic flow diagram in FIG. 2. Also illustrated in FIG. 2 is an exemplary controller 54 for controlling the sequence of operation of the flow of heat transfer fluid through the apparatus and the switching of the distribution valve 42. The controller 54 may receive signals, for example, from limit switches 55 and 56 which are switched by the moving second valve member 44 at the upper and lower terminal positions of the distribution valve 42. The controller is connected by electrical lines 57 to a solenoid operated normally closed valve 58 in the line 28 leading from the pump 25 and is connected by an electrical supply line 59 to the solenoid of a solenoid operated bypass valve 60 which is connected around the pump 25. The controller is also connected by an electrical signal line 62 to a valve 63 which controls the supply of air to the drive cylinder 48.

The controller 54, which may be a standard programmable controller, a set of relays, etc., determines the position of the distribution valve 42 by the signals received from the limit switches 55 and 56. When the valve 42 reaches one of its terminal positions, the controller provides signals to open the valve 58 and close the bypass valve 60, thereby directing heat transfer fluid provided under pressure from the pump 25 through the valve 42 and thence on a circulating path through the cold heat exchanger 24 to the hot heat exchanger 23 and thence back to the pump 25. After the distribution valve 42 has dwelled for a selected period of time at its one terminal position, the controller provides signals to the valves 58 and 60 to close the valve 58 and open the valve 60, thus cutting off the flow of heat transfer fluid to the distribution valve 42. The controller then also provides a signal on the line 62 to the valve 63 to cause the drive cylinder 48 to switch the distribution valve 42 to its other terminal position. When the valve 42 reaches its other position, the appropriate one of the limit switches 55 or 56 provides a signal to the controller indicating that the terminal position has been reached, and the controller then provides signals to the valves 58 and 60 to open the valve 58 and close the valve 60, to again provide heat transfer fluid through the distribution valve 42 to the cold heat exchanger and to the hot heat exchanger. This cycle of switching of the valve 42 is then repeated continuously (or until the desired temperature of the load to be cooled is reached). Depending on the manner of operation of the drive 48, the controller may provide a signal to the valve 63 to cut off air to the valve 48. Alternatively, the drive cylinder 48 may be selected so that the cylinder operates between hard limits of travel of the piston rod of the drive cylinder 48, with the limits of travel of the cylinder coinciding with the desired terminal positions of the distribution valve 42. In the latter case, the controller may maintain the valve 63 switched to continue to provide air under pressure to the drive cylinder 48 in one direction to maintain the cylinder at its limit position until the valve 42 is to be switched, whereupon the controller may switch the supply of air to the cylinder 48 to drive the cylinder to its other limit and the distribution valve 42 to the opposite terminal position of the distribution valve 42.

The distribution valve 42 and pump bypass valve 60 are used in the case of the Brayton cycle to ensure that no flow occurs during the field change part of the cycle. If a cycle intermediate between the Brayton and Ericsson cycles is desired, the distribution valve and bypass valve timing may be modified to allow flow during the initial and/or final parts of the bed motion. Two modifications that may be used to allow such flow are, first, to lengthen the opening slots in the inner first valve member 43 of the distribution valve, or, second, to allow the inner first valve member 43 to move a limited distance at the start of the motion of the outer second valve member 44 of the valve. This motion may be induced by the friction in the seals between the inner and outer valve members; the motion can be limited in displacement by mechanical stops.

The refrigeration materials used may be selected to best suit the refrigeration cycle chosen. See, e.g., C. R. Cross, et al., "Optimal Temperature—Entropy Curves For Magnetic Refrigeration," Adv. Cryogenic Engineering, R. W. Fast, Ed., Vol. 33, Plenum Press, 1988, pp. 767–776.

The active magnetic regenerator refrigeration apparatus 20 may be utilized in conventional commercial refrigeration applications, e.g., for cooling of cold storage facilities, food lockers, and so forth, in which case the hot heat exchanger 23 may be a conventional radiator type heat exchanger suited to discharge heat to the ambient air. The cold heat exchanger 24 may comprise pipes mounted to an interior wall of a refrigerated space such as a food locker, or it may be formed as a conventional radiator for absorbing heat from ambient air within a refrigerated space.

Figure 2A:
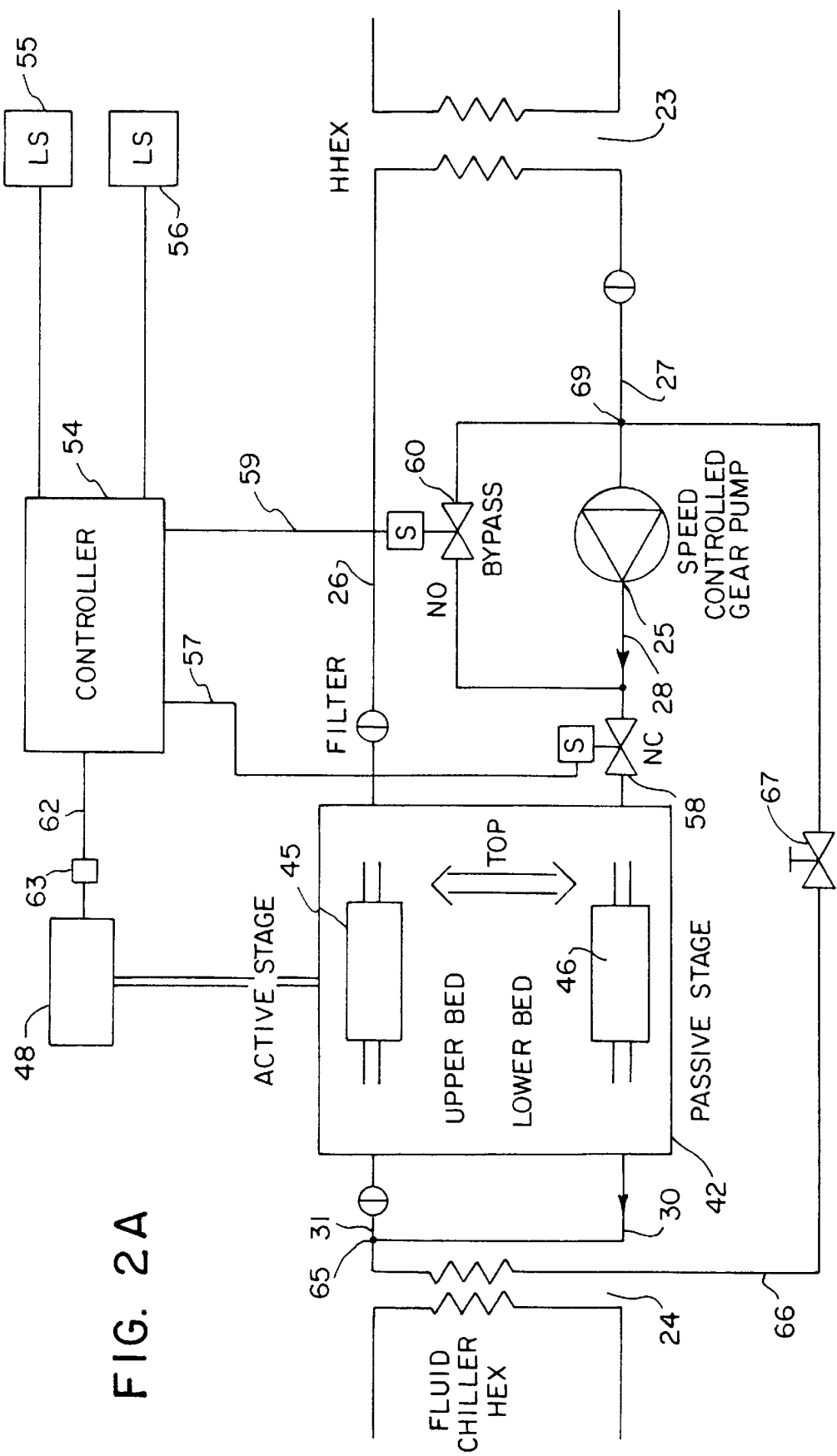
FIG. 2A is fluid flow schematic of a refrigeration system similar to that of FIG. 2, but modified to chill a fluid from a hot temperature to a cool temperature.

The refrigeration system of FIG. 2 is designed to remove heat at a cold temperature at the cold heat exchanger 24 and exhaust heat at a high temperature at the hot heat exchanger 23. The system of FIG. 2 can be modified as shown in FIG. 2A to chill a fluid at a hot temperature to a cold temperature. In the arrangement of FIG. 2A, the cold fluid on the conduits 30 is directed to a Tee connector 65 which splits the flow of fluid so that a portion flows back to the distribution valve 42 on the conduits 31 and a portion flows through a fluid chiller heat exchanger 24 (e.g., the cold heat exchanger 24 may be used to cool water flowing through it). The fluid passed through the cold heat exchanger 24 is directed on a conduit 66 through a flow control valve 67 to a connector 69 which joins to the conduit 27 to direct the fluid from the conduit 66 to the input of the pump 25. The fluid from the conduit 66 is then driven by the pump 25 back to the distribution valve 42. This arrangement has the advantage for the purpose of chilling a fluid of reducing the work input required because most of the heat removed from the fluid is not carried through the full temperature lift experienced by the fluid that is chilled. The advantages of such unbalanced flow are described in the aforementioned U.S. Pat. No. 5,249,424, incorporated herein by reference.

Figure 3:
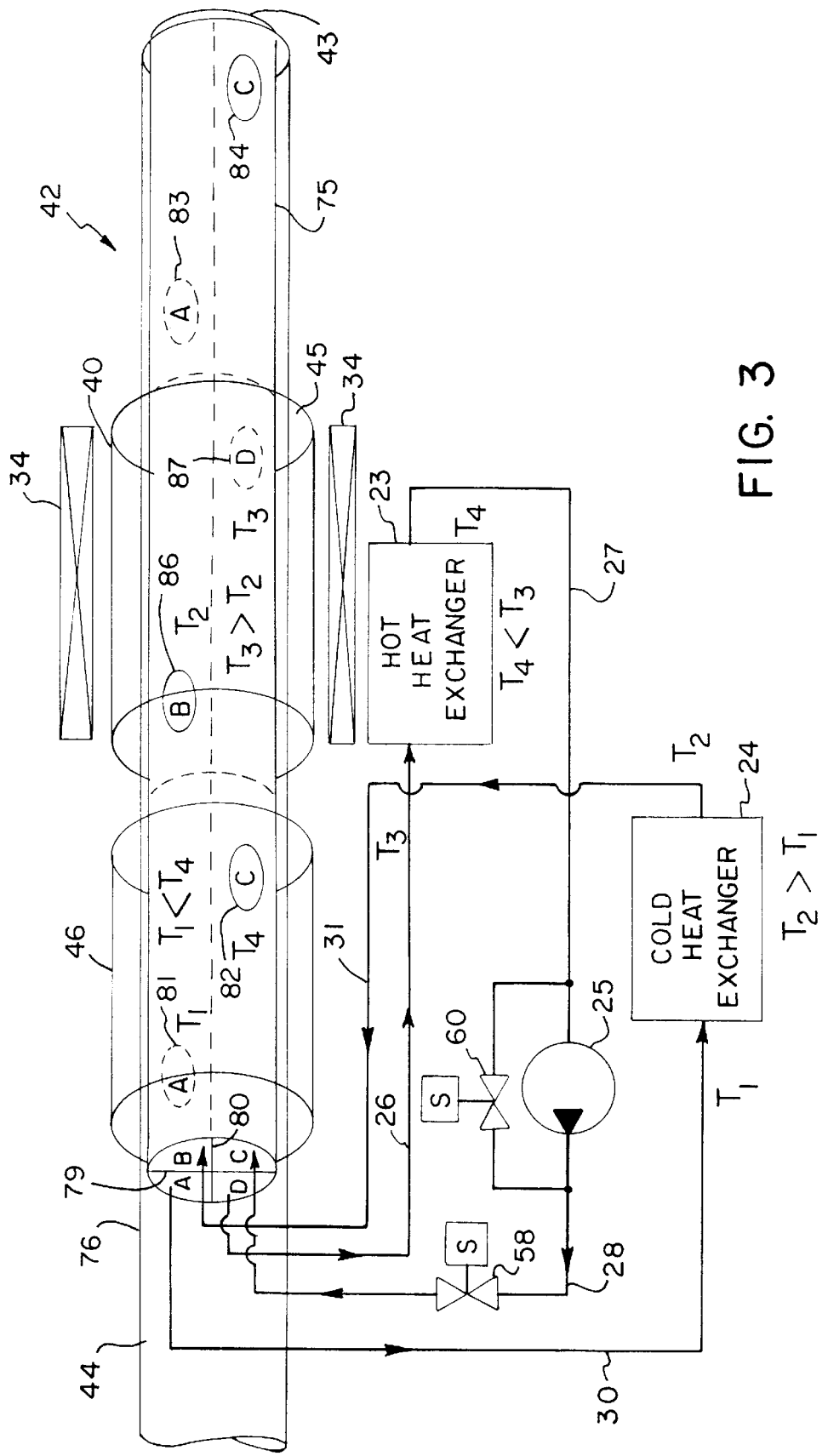
FIG. 3 is an illustrative view of the operation of the distribution valve in conjunction with the hot and cold heat exchangers showing a first terminal position of the distribution valve and the regenerator beds.
Figure 4:
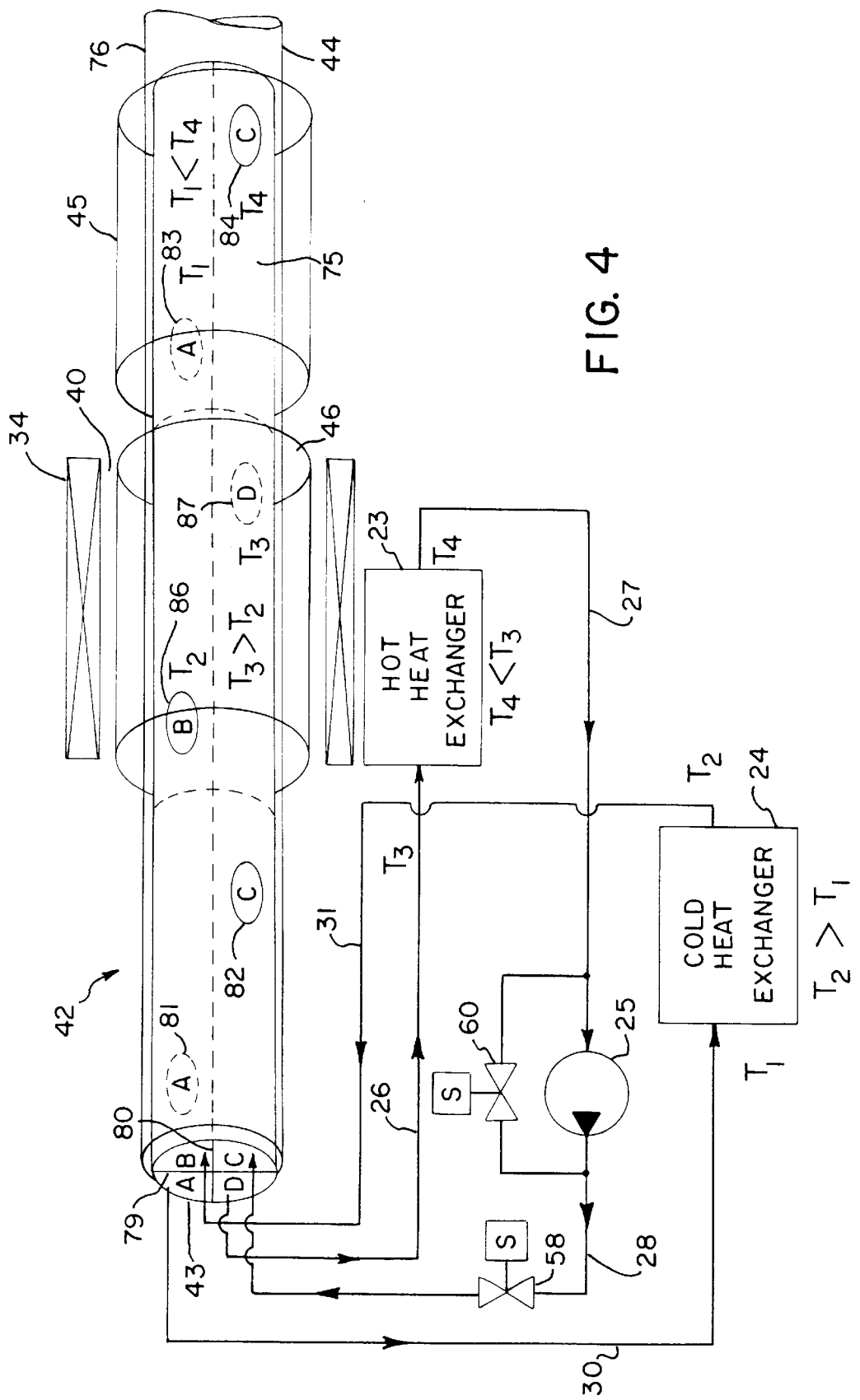
FIG. 4 is a view as in FIG. 3 showing the second terminal position of the distribution valve and the regenerator beds.
Figure 8:
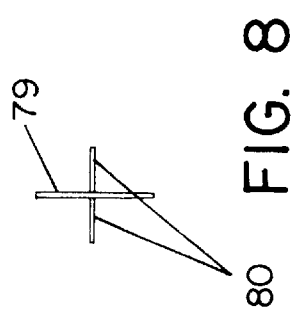
Figure 10:
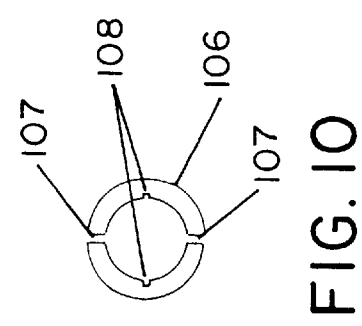
Figure 7:
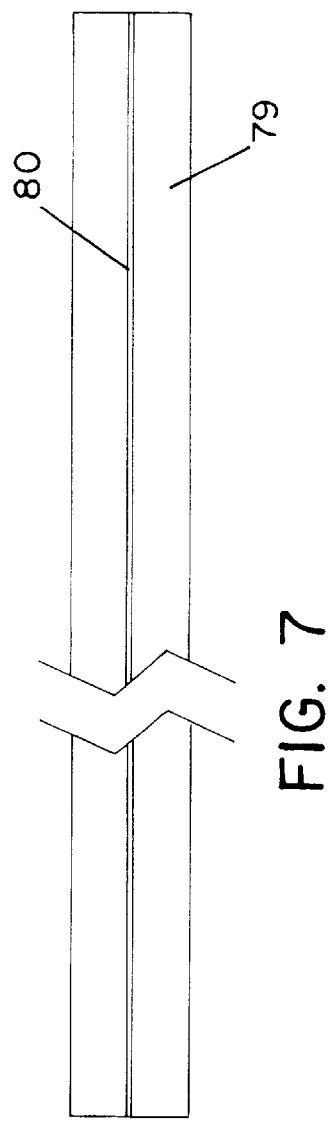
Figure 9:
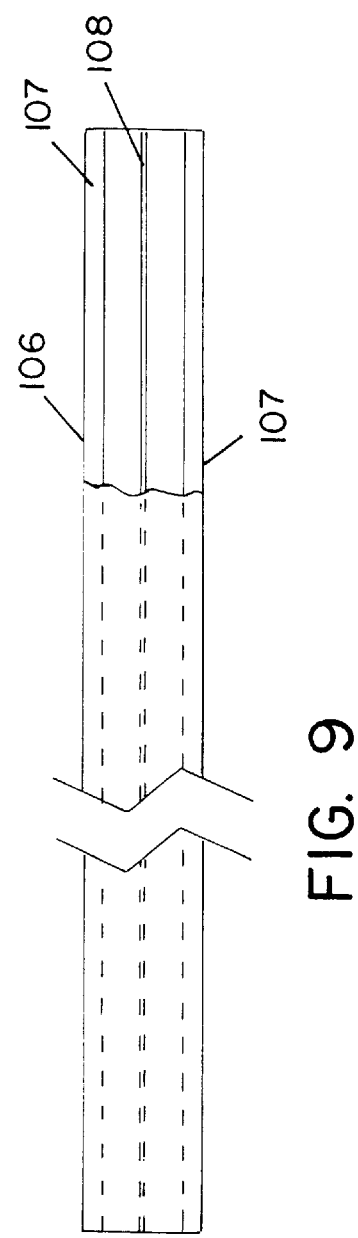

The action of the self-activating distribution valve 42 is illustrated in FIGS. 3 and 4, which show the positions of the regenerator beds 45 and 46 in the two terminal positions of the valve 42. The position of the valve 42 shown in FIG. 3 corresponds to the position of the valve in FIG. 1. The valve 42 is shown schematically in FIGS. 3 and 4 for purposes of illustration and is described in more detail below. The first valve member 43 of the distribution valve 42 has an inner cylindrical tube 75 which is stationary and which is connected via the manifold 49 to the conduits 26, 28, 30 and 31, and the moving second valve member 44 has an outer tube 76 which is mounted around the inner tube 75 and has an inside diameter slightly larger than the outside diameter of the inner tube 75. Thus, the outer tube 76 can slide coaxially with and in close engagement to the inner tube 75. The outer tube 76 of the moving member 44 is connected to the shaft 47 to be driven in reciprocating motion by the drive 48, as illustrated in FIG. 1, preferably through the interposition of a universal joint 78 to accommodate any slight displacements of the outer tube 76 that may be necessary to allow it to slide freely on the inner tube 75.

The inner tube 75 of the first valve member preferably has a hollow lumen which is divided by walls 79 and 80 into four quadrants, labeled A, B, C and D in FIGS. 3 and 4, each quadrant constituting an axial internal conduit of the first valve member. The inner tube 75 has three pairs of openings formed in its outer wall, a first pair 81 and 82 which open into the quadrants A and C, respectively, at positions outside of the position of the magnetic field 40 within the magnet 34; a second pair of openings 83 and 84, opening to the quadrants A and C, respectively, which are also outside the area 40 of the magnetic field; and a third pair of openings 86 and 87, opening into the quadrants B and D, with the third pair of openings 86 and 87 positioned within the magnetic field area 40 of the magnet 34. The spacing between the two openings in each pair is the same for each pair. Although not shown in FIGS. 3 and 4, the moving member outer tube 76 has pairs of ports extending through the wall of the outer tube and opening into the regenerator beds 45 and 46 near the ends of the beds. The ports in the outer wall are spaced apart a distance equal to the spacing between the pairs of openings 81–82, 83–84 and 86–87. In the position of the valve shown in FIG. 3, the ports in the regenerator bed 45 are aligned with the openings 86 and 87 and the ports in the regenerator bed 46 are aligned with the openings 81 and 82. In these positions, heat transfer fluid can flow freely through these openings from the divided lumen of the inner tube to the regenerator beds and back again through the openings. Similarly, when the valve 42 is in the position shown in FIG. 4, the openings 83 and 84 align with the ports in the regenerator bed 45 and the openings 86 and 87 align with the ports in the regenerator bed 46, allowing free flow of heat transfer fluid to and from the beds through these openings.

In the first position of the valve 42 as shown in FIG. 3, heat transfer fluid is forced by the pump 25 through the conduit 28 to the quadrant C conduit of the distribution valve and thence out the opening 82 into the regenerator bed 46. After passing through the regenerator bed 46, the heat transfer fluid flows out through the opening 81 into the quadrant A conduit and thence out of the inner tube 75 through the conduit 30 to the cold heat exchanger 24. Because the regenerator bed 46 is outside of the field of the magnet 34 in FIG. 3, it has decreased in temperature and the fluid exiting through the opening 81 from the bed 46 is at a low temperature $T_1$. The heat transfer fluid at a temperature $T_1$ flows through the cold heat exchanger 24, picks up heat, and exits at a higher temperature $T_2$ on the conduit 31. The fluid is directed by the conduit 31 to the quadrant B conduit of the first valve member and exits through the opening 86 into the regenerator bed 45. After passing through the bed 45, the heat transfer fluid exits through the opening 87 to the quadrant D conduit and passes out of the first valve member 43 through the conduit 26 to the hot heat exchanger 23. Because the regenerator bed 45 is within the magnetic field of the magnet 34, the magnetocaloric material within the bed 45 has increased in temperature, and the heat transfer fluid flowing through the bed 45 picks up heat. Thus, the temperature $T_3$ of the fluid exiting the bed 45 through the opening 87 is greater than the temperature $T_2$ at which the fluid entered the bed through the opening 86. The heat transfer fluid at the temperature $T_3$ passes through the hot heat exchanger 23, loses heat, and exits at a lower temperature $T_4$. The fluid at the temperature $T_4$ is passed on the conduit 27 through the pump 25 and thence on the conduit 28 back into the quadrant C conduit where the fluid again exits through the opening 82 into the regenerator bed 46.

In the second position of the valve 42, as shown in FIG. 4, heat transfer fluid is driven by the pump 25 through the conduit 28 to the quadrant C conduit and thence passes through the opening 84 into the regenerator bed 45, which is outside the magnetic field at that time so that the magnetocaloric material within the bed 45 has decreased in temperature. The heat transfer fluid passing through the bed 45 loses heat to the magnetocaloric material in the bed, decreases in temperature, and exits through the opening 83 at a temperature $T_1$ into the quadrant A conduit. The fluid passes out of quadrant A conduit and through the conduit 30 to the cold heat exchanger 24, where the fluid picks up heat and exits the heat exchanger at a temperature $T_2$ on the conduit 31 from which it passes into the quadrant B conduit of the first valve member 43. The fluid exits from the quadrant B conduit through the opening 86 into the magnetocaloric material of the regenerator bed 46, which, because it is in the magnetic field of the magnet 34, has increased in temperature. The heat transfer fluid passing through the bed 46 thus receives heat from the magnetocaloric material, increases in temperature, and exits through the opening 87 at a temperature $T_3$ which is greater than the entrance temperature $T_2$. The fluid exiting through the opening 87 into the quadrant D conduit passes through the conduit 26 and then through the hot heat exchanger 23, where it loses heat and exits at a temperature $T_4$ which is lower than the temperature $T_3$. This fluid is then passed on the conduit 27 to the pump 25 where it is driven into the conduit 28 and thence back into the quadrant C conduit of the first valve member 43.

Seals between the first valve member inner tube 75 and the inside of the moving second valve member outer tube 76 seal off the openings 83 and 84 in the position of the valve shown in FIG. 3, and seal off the openings 81 and 82 in the position of the valve 42 shown in FIG. 4. Such seals also prevent the fluid that passes from the openings in the inner tube to the ports in the regenerator beds 45 and 46 from leaking into the space between the inner tube 75 and the outer tube 76. As noted above, during the switching of the valve 42, the solenoid controlled valve 58 is preferably closed and the valve 60 open so that no heat transfer fluid is flowing through the valve 42, thereby further minimizing the possibility of leakage of heat transfer fluid.

The moving second valve member 44 and the regenerator beds 45 and 46 are shown in a more detailed cross-sectional view in FIG. 5. As illustrated therein, the outer tube 76 of the moving second valve member 44 is formed as a thin-walled tube, e.g., of polyvinyl chloride, or other plastic, or epoxy-fiberglass, etc. The tube 76 preferably has a smooth cylindrical inner surface 90, preferably having a solid lubricant such as graphite incorporated into the wall, which is suited for smooth sliding engagement with the outer surface of the stationary inner tube 75. The regenerator beds 45 and 46 are similarly constructed, and are mounted to the outer tube 76 of the moving second valve member 44 at an appropriate spacing from one another. Each of the regenerator beds 45 and 46 has a casing composed of a cylindrical outer wall 92 and end walls 93 that engage the outer surface of the outer tube 76 and are secured thereto, e.g., with adhesive. The walls 92 and 93 may also be formed of, e.g., plastic or epoxy-fiberglass. In general, the parts subjected to movement in the magnetic field should be formed of material that has minimal eddy current losses. The cylindrical outer wall 92 and end walls 93 define with the surface 94 of the outer tube 76 an annular volume which is packed with porous magnetocaloric material 95. The porous magnetocaloric material 95 may be in the form of small granules packed together, leaving interstices through which the heat transfer fluid can pass and flow around the individual particulates of magnetocaloric material, but the material 95 may be physically formed in other ways, such as spaced sheets of material. If desired, the particulate material may be sintered for greater structural stability. The particular magnetocaloric material chosen will depend upon the temperature range of operation of the regenerator apparatus and the available magnetic field of the magnet 34. Examples of such materials particularly suited for use at cryogenic temperatures are given in the aforesaid U.S. Pat. No. 5,249,424. For operation at or near room temperature, one type of suitable magnetocaloric material is gadolinium, and a suitable heat transfer fluid is water or water mixed with antifreeze. Preferably, a buffered water solution is used to eliminate chemical reactions between the magnetocaloric material and the heat transfer fluid.

Ports 97 are formed in the wall of the moving member outer tube 76 at the ends of the beds 45 and 46 at positions adjacent to the end walls 93. These ports are preferably formed, as illustrated in FIG. 6, as a series of spaced slots in the wall of the outer tube 76, preferably covered by a screen 98 to prevent loose magnetocaloric material 95 from migrating through the slots forming the ports 97 or from clogging the slots. Preferably, the moving second valve member 44 further includes a cylindrical tube 99 mounted around the outer tube 76 between the beds 45 and 46 and secured to the respective end walls 93 of these two beds to provide positive spacing of the beds 45 and 46 and to hold the beds more firmly in place on the outer tube 76.

A more detailed external view of the construction of the first valve member 43 is shown in FIG. 6. Each of the openings 81, 82, 83, 84, 86 and 87 in the inner tube 75 is preferably formed as a central indented section 100 in the wall of the inner tube on either side of which are formed grooves 102 in the tube wall in which are mounted seals, such as rubber O-rings 105. The openings 81, 82, 83, 84, 86 and 87 are preferably formed as slots 103 in the wall of the tube 75 that extend to the appropriate quadrant conduit of the first valve member. Heat transfer fluid flowing outwardly from one of the quadrant conduits through the slots 103 can flow entirely around the circumference of the indented slot 100, but will be blocked by the O-ring seals 105 from flowing into the space between the inner and outer tubes 75 and 76. The fluid can thus flow to the ports 97 in the outer tube at positions around the entire circumference of the outer tube. Similarly, heat transfer fluid flowing back from the regenerator beds 44 and 45 through the ports 97 can flow into the space defined by the indentation 100 around the entire circumference of the inner tube until the fluid flows to the position of the slots 103 and then through the slots into the appropriate quadrant conduit within the first valve member 43.

A preferred manner of forming the first valve member internal conduits within the inner tube 75 is illustrated with respect to the view of FIGS. 7–14. As shown in side view in FIG. 7 and in end view in FIG. 8, the perpendicular interior walls 79 and 80 may be formed initially by gluing together strips of flat material, e.g., epoxy fiberglass or polyvinyl chloride, with an appropriate glue (e.g., Hysol® epoxy). A thin-walled tube 106, as shown in side view in FIG. 9 and in end view in FIG. 10, having appropriate outer dimensions, is cut in half along its length at diametrically opposite cut positions 107. Grooves 108 are then cut into the walls of the two halves at midway positions in each half. The width of the walls 79 and 80 is selected so that the walls 80 fit into the grooves 108 while the ends of the walls 79 fill the space left by the cuts 107, as illustrated in side view in FIG. 11 and in end view in FIG. 12. The perpendicular walls 79 and 80 are glued in place, e.g., with epoxy, and then the outside of the completed tube 75 may be coated to form a smooth, strong structure, e.g., by gel-coating the outside of the tube with Hysol® epoxy. One end of the tube may then be capped by gluing an end plug 109 into the bore of the tube 75 to seal off the quadrants defined by the walls 79 and 80 as illustrated in FIG. 11. A centerless grind and machining operation is then carried out to form the O-ring grooves 102, the indented portions 100 and the slots 103 (not shown in FIGS. 11 and 13). The other end of the tube 75 then has the manifold 49 mounted thereto as shown in side view in FIG. 13 and end view in FIG. 14. The manifold 49 may be formed, for example, of a cylindrical enclosure divided by internal walls into four chambers, with openings at the top of each chamber which are in communication with the four quadrant conduits within the inner tube 75, and with four ports 110 in the outside walls of the manifold 49, constituting the inlet and outlet ports of the first valve member 43 and each opening into one chamber of the manifold, to which the conduits 26, 28, 30 and 31 are connected.

It is understood that the invention is not confined to the particular construction and arrangement of parts herein illustrated and described, but embraces all such modified forms thereof as come within the scope of the following claims.

What is claimed is:

1. An active magnetic regenerator comprising:
   (a) a magnet producing a magnetic field;
   (b) a distribution valve having a first valve member and a moving second valve member slidably engaged to one another, the first valve member and the moving second valve member each having ports by which heat transfer fluid may be provided to and received from the valve member;
   (c) a magnetic regenerator bed including material that exhibits the magnetocaloric effect that is porous and allows the flow of heat transfer fluid through such magnetocaloric material, the bed mounted to the moving second valve member of the distribution valve to move with it, the moving second valve member having a port opening into a first side of the bed and a port opening into a second side of the bed so that fluid flowing between the ports flows through the magnetocaloric material of the bed; and
   (d) a reciprocating drive connected to the moving second valve member to slide the moving second valve member and the regenerator bed mounted to it between a first position in which the regenerator bed is outside of the magnetic field of the magnet to a second position in which the regenerator bed is in the magnetic field of the magnet.

2. The active magnetic regenerator of claim 1 wherein the regenerator bed is a first regenerator bed and including a second regenerator bed including material that exhibits the magnetocaloric effect that is porous and allows the flow of heat transfer fluid through such magnetocaloric material, the second regenerator bed mounted to the moving second valve member of the distribution valve such that the two regenerator beds are spaced from each other, the moving second valve member having a port opening into a first side of the second regenerator bed and a port opening into a second side of the second regenerator bed so that fluid flowing between the ports flows through the magnetocaloric material of the second regenerator bed, and wherein the drive moves the moving second valve member between the first position in which the first regenerator bed is outside the magnetic field of the magnet and the second regenerator bed is inside the magnetic field of the magnet and a second position in which the first regenerator bed is in the magnetic field of the magnet and the second regenerator bed is outside of the magnetic field of the magnet.

3. The active magnet regenerator of claim 1 wherein the magnet is formed of a solenoidal winding of superconductor, and including a dewar in which the solenoidal superconducting winding is held to cool the winding, and a central opening in the dewar extending through the solenoidal superconducting winding, the distribution valve and regenerator bed mounted thereto positioned within the opening in the dewar for movement of the moving second valve member by the drive from a position in which the regenerator bed is outside of the magnetic field produced within the solenoidal winding to a position in which the regenerator bed is in the magnetic field of the solenoidal winding.

4. The active magnetic regenerator of claim 1 wherein the first valve member is formed as an elongated hollow inner tube having an outside surface and wherein the moving second valve member is formed as an elongated hollow tube having an inside diameter slightly larger than the outside diameter of the inner tube and is mounted to slide axially on the inner tube, the inner tube having an inner lumen divided into four quadrants to define four quadrant conduits and including two pairs of openings in the wall of the inner tube, one pair of openings communicating with two of the four quadrant conduits and located at a position outside of the magnetic field of the magnet and a second pair of openings communicating with the other two quadrant conduits and located at a position within the magnetic field of the magnet, and wherein the regenerator bed is mounted around the outer tube of the moving second valve member and wherein the ports in the moving second valve member are spaced apart a distance equal to the spacing between the pairs of openings in the inner tube such that the two ports in the moving second valve member are in communication with a first two of the quadrant conduits of the inner tube when the distribution valve is in a position with the regenerator bed outside the magnetic field and wherein the ports in the moving second valve member are in communication with the other two quadrant conduits of the inner tube when the distribution valve is in a position with the regenerator bed within the magnetic field of the magnet.

5. The active magnetic regenerator of claim 4 wherein the regenerator bed includes an outer cylindrical casing and end walls to define an annular enclosure between the walls of the casing, the end walls and the outer tube of the moving second valve member, the porous magnetocaloric material filling the annular enclosure.

6. The active magnetic regenerator of claim 5 wherein the two ports in the moving second valve member comprise slots formed through the wall of the outer tube of the moving second valve member at positions adjacent to the end walls of the casing of the regenerator bed.

7. The active magnetic regenerator of claim 5 wherein there are two regenerator beds having the same construction mounted at spaced positions on the outer tube of the moving second valve member, wherein the drive moves the moving second valve member between a first position in which a first of the beds is in the magnetic field and a second of the beds is outside the magnetic field of the magnet to a second position in which the first of the beds is outside of the magnetic field and the second of the beds is in the magnetic field, and including a third pair of openings in the inner tube of the first valve member located at positions outside of the magnetic field and opening into the same quadrants of the divided lumen of the inner tube of the first valve member as the other pair of openings that are also located in the inner tube at a position outside of the magnetic field of the magnet.

8. The active magnetic regenerator of claim 7 wherein the outer tube of the moving second valve member covers all of the pairs of openings in the inner tube of the first valve member at all positions of the moving second valve member, and including seals between the inner and outer tubes adjacent the openings in the inner tube to inhibit the flow of heat transfer fluid from the openings in the inner tube into the space between the inner and outer tubes.

9. The active magnetic regenerator of claim 8 wherein grooves are formed in the outside surface of the inner tube at positions on either side of the openings in the inner tube, and including O-rings mounted in the grooves that seal against the inner surface of the outer tube to provide the seals about each opening to inhibit fluid from flowing from the opening into the space between the inner and outer tubes while allowing the inner and outer tubes to slide with respect to each other.

10. The active magnetic regenerator of claim 9 wherein an indentation is formed about the circumference of the inner tube at the position of each opening in the inner tube so that fluid can flow to or from the opening about the entire circumference of the inner tube within the indentation.

11. The active magnetic regenerator of claim 4 wherein the lumen of the inner tube is divided into four quadrant conduits by straight intersecting walls extending axially through the inner tube and engaged with the cylindrical wall of the inner tube.

12. The active magnetic regenerator of claim 11 wherein the first valve member includes a manifold mounted to an end of the inner tube and having four chambers with each chamber in communication with one of the four quadrant conduits of the divided lumen of the inner tube, and wherein the ports of the first valve member are formed as openings in the manifold leading to the four chambers within the manifold each of which is in communication with one of the quadrant conduits of the divided lumen of the inner tube.

13. The active magnetic regenerator of claim 4 wherein the drive comprises an air cylinder having a shaft extending therefrom which is connected to the outer tube of the moving second valve member, the air cylinder drive operative to move the shaft thereof and the outer tube connected thereto between two positions, one position in which the regenerator bed is out of the magnetic field of the magnet and the other position, in which the regenerator bed is in the magnetic field of the magnet.

14. An active magnetic regenerator comprising:
   (a) a magnet producing a magnetic field;
   (b) a distribution valve having a first valve member and a moving second valve member slidably engaged to one another, the first valve member and the moving second valve member each having ports by which heat transfer fluid may be provided to and received from the valve member;
   (c) a first regenerator bed and a second regenerator bed each including material that exhibits the magnetocaloric effect that is porous and allows the flow of heat transfer fluid through such magnetocaloric material, the first and second regenerator beds mounted to the moving second valve member such that the two regenerator beds are spaced from each other, the moving second valve member having a port opening into a first side of the first bed and a port opening into a second side of the first bed so that fluid flowing between the ports flows through the magnetocaloric material of the first bed, the moving second valve member also having a port opening into a first side of the second bed and a port opening into a second side of the second bed so that fluid flowing between the ports flows through the magnetocaloric material of the second regenerator bed; and
   (d) a reciprocating drive connected to the moving second valve member to slide the moving second valve member and the regenerator beds mounted to it between a first position in which the first regenerator bed is outside the magnetic field of the magnet and the second regenerator bed is in the magnetic field of the magnet and a second position in which the first regenerator bed is in the magnetic field of the magnet and the second regenerator bed is outside of the magnetic field of the magnet.

15. The active magnetic regenerator of claim 14 wherein the first valve member is formed as an elongated hollow inner tube having an outside surface and wherein the moving second valve member is formed as an elongated hollow tube having an inside diameter slightly larger than the outside diameter of the inner tube and mounted to slide axially on the inner tube, the inner tube having an inner lumen divided into four quadrants to define four quadrant conduits and including three pairs of openings in the wall of the inner tube, two pairs of equally spaced openings communicating with two of the four quadrant conduits and located at a position outside of the magnetic field of the magnet and a third pair of openings positioned between the other two pairs communicating with the other two quadrant conduits and located at a position within the magnetic field of the magnet, and wherein the regenerator beds are mounted around the outer tube of the moving second valve member and wherein the ports in the moving second valve member communicating with the beds are spaced apart a distance equal to the spacing between the pairs of openings in the inner tube such that in the first position of the distribution valve the ports in the moving second valve member opening into the first bed are in communication with a first two of the quadrant conduits of the inner tube and wherein the ports in the moving second valve member opening into the second bed are in communication with the other two quadrant conduits of the inner tube, and wherein in the second position of the moving second valve member the ports opening into the two beds are in communication with the quadrant conduits that they were not in communication with in the first position.

16. The active magnetic regenerator of claim 15 wherein each regenerator bed includes an outer cylindrical casing and end walls to define an annular enclosure between the walls of the casing, the end walls and the outer tube of the moving second valve member, the porous magnetocaloric material filling the annular enclosure.

17. The active magnetic regenerator of claim 16 wherein the two ports in the moving second valve member opening into each bed comprise slots formed through the wall of the outer tube of the moving second valve member at positions adjacent to the end walls of the casing of the regenerator bed.

18. The active magnetic regenerator of claim 15 wherein the outer tube of the moving second valve member covers all of the pairs of openings in the inner tube of the first valve member at all positions of the moving second valve member, and including seals between the inner and outer tubes adjacent the openings in the inner tube to inhibit the flow of heat transfer fluid from the openings in the inner tube into the space between the inner and outer tubes.

19. The active magnetic regenerator of claim 18 wherein grooves are formed in the outside surface of the inner tube at positions on either side of the openings in the inner tube, and including O-rings mounted in the grooves that seal against the inner surface of the outer tube to provide the seals about each opening to inhibit fluid from flowing from the opening into the space between the inner and outer tubes while allowing the inner and outer tubes to slide with respect to each other.

20. The active magnetic regenerator of claim 19 wherein an indentation is formed about the circumference of the inner tube at the position of each opening in the inner tube so that fluid can flow to or from the opening about the entire circumference of the inner tube within the indentation.

21. The active magnetic regenerator of claim 15 wherein the lumen of the inner tube is divided into four quadrant conduits by straight intersecting walls extending axially through the inner tube and engaged with the cylindrical wall of the inner tube.

22. The active magnetic regenerator of claim 21 wherein the first valve member includes a manifold mounted to an end of the inner tube and having four chambers with each chamber in communication with one of the four quadrant conduits of the divided lumen of the inner tube, and wherein the ports of the first valve member are formed as openings in the manifold leading to the four chambers within the manifold each of which is in communication with one of the quadrant conduits of the divided lumen of the inner tube.

23. The active magnetic regenerator of claim 15 wherein the drive comprises an air cylinder having a shaft extending therefrom which is connected to the outer tube of the moving second valve member, the air cylinder drive operative to move the shaft thereof and the outer tube connected thereto between two positions, the first position in which the first bed is out of the magnetic field of the magnet and the second bed is in the magnetic field and the second position, in which the first bed is in the magnetic field of the magnet and the second bed is out of the magnetic field.

24. An active magnetic regenerator refrigeration apparatus comprising:

(a) a magnet producing a magnetic field;

(b) a distribution valve having a first valve member and a moving second valve member slidably engaged to one another, the first valve member and the moving second valve member each having ports by which heat transfer fluid may be provided to and received from the valve member;

(c) a magnetic regenerator bed including material that exhibits the magnetocaloric effect that is porous and allows the flow of heat transfer fluid through such magnetocaloric material, the bed mounted to the moving second valve member to move with it, the moving second valve member having a port opening into a first side of the bed and a port opening into a second side of the bed so that fluid flowing between the ports flows through the magnetocaloric material of the bed;

(d) a reciprocating drive connected to the moving second valve member to slide the moving second valve member and the regenerator bed mounted to it between a first position in which the regenerator bed is outside of the magnetic field of the magnet to a second position in which the regenerator bed is in the magnetic field of the magnet;

(e) a hot heat exchanger;

(f) a cold heat exchanger;

(g) conduits connected to the ports of the first valve member and to the hot and cold heat exchangers, the conduits directing heat transfer fluid in a circuit from the bed which is outside the magnetic field through the distribution valve to the cold heat exchanger and then back through the distribution valve to the bed that is in the magnetic field and then through the distribution valve to the hot heat exchanger and then back through the distribution valve to the bed that is outside of the magnetic field, the distribution valve directing the flow therethrough so that the circuit of flow through the conduits is maintained in the same direction in both positions of the distribution valve and with the direction of flow through each bed reversed in each position of the valve; and (h) a pump connected in the conduits to drive heat transfer fluid through the hot and cold heat exchangers, the conduits and the distribution valve.

25. The refrigeration apparatus of claim 24 including a solenoid operated valve connected in a conduit leading from the pump and a controller connected to the drive and the solenoid valve to control the drive to switch the distribution valve at selected times and cause the distribution valve to dwell at its first and second positions for selected times, and to control the solenoid valve to block flow of heat transfer fluid from the pump when the distribution valve is being switched between its two positions and to open the solenoid valve to allow flow from the pump when the distribution valve is dwelling in its two positions.

26. The refrigeration apparatus of claim 25 including a solenoid valve connected around the pump and connected to the controller to be controlled to close when the distribution valve is dwelling in its two positions and to open when the distribution valve is being switched between its two positions.

27. The refrigeration apparatus of claim 24 wherein the regenerator bed is a first regenerator bed and including a second regenerator bed including material that exhibits the magnetocaloric effect that is porous and allows the flow of heat transfer fluid through such magnetocaloric material, the second regenerator bed mounted to the moving second valve member such that the two regenerator beds are spaced from each other, the moving second valve member having a port opening into a first side of the second regenerator bed and a port opening into a second side of the second regenerator bed so that fluid flowing between the ports flows through the magnetocaloric material of the second regenerator bed, and wherein the drive moves the moving second valve member between the first position in which the first regenerator bed is outside the magnetic field of the magnet and the second regenerator bed is in the magnetic field of the magnet and a second position in which the first regenerator bed is in the magnetic field of the magnet and the second regenerator bed is outside of the magnetic field of the magnet.

28. The refrigeration apparatus of claim 24 wherein the magnet is formed of a solenoidal winding of superconductor, and including a dewar in which the solenoidal superconducting winding is held to cool the winding, and a central opening in the dewar extending through the solenoidal superconducting winding, the distribution valve and regenerator bed mounted thereto positioned within the opening in the dewar for movement of the moving second valve member by the drive from a position in which the regenerator bed is outside of the magnetic field produced within the solenoidal winding to a position in which the regenerator bed is in the magnetic field of the solenoidal winding.

29. The refrigeration apparatus of claim 24 wherein the first valve member is formed as an elongated hollow inner tube having an outside surface and wherein the moving second valve member is formed as an elongated hollow tube having an inside diameter slightly larger than the outside diameter of the inner tube and mounted to slide axially on the inner tube, the inner tube having an inner lumen divided into four quadrants to define four quadrant conduits and including two pairs of openings in the wall of the inner tube, one pair of openings communicating with two of the four quadrant conduits and located at a position outside of the magnetic field of the magnet and a second pair of openings communicating with the other two quadrant conduits and located at a position within the magnetic field of the magnet, and wherein the regenerator bed is mounted around the outer tube of the moving second valve member and wherein the ports in the moving second valve member are spaced apart a distance equal to the spacing between the pairs of openings in the inner tube such that the two ports in the moving second valve member are in communication with a first two of the quadrant conduits of the inner tube when the distribution valve is in a position with the regenerator bed outside the magnetic field and wherein the ports in the moving second valve member are in communication with the other two quadrant conduits of the inner tube when the valve is in a position with the regenerator bed within the magnetic field of the magnet.

30. The refrigeration apparatus of claim 29 wherein the regenerator bed includes an outer cylindrical casing and end walls to define an annular enclosure between the walls of the casing, the end walls and the outer tube of the moving second valve member, the porous magnetocaloric material filling the annular enclosure.

31. The refrigeration apparatus of claim 30 wherein the two ports in the moving second valve member comprise slots formed through the wall of the outer tube of the moving second valve member at positions adjacent to the end walls of the casing of the regenerator bed.

32. The refrigeration apparatus of claim 30 wherein there are two regenerator beds having the same construction mounted at spaced positions on the outer tube of the moving second valve member, wherein the drive moves the moving second valve member between a first position in which a first of the beds is in the magnetic field and a second of the beds is outside the magnetic field of the magnet to a second position in which the first of the beds is outside of the magnetic field and the second of the beds is in the magnetic field, and including a third pair of openings in the inner tube of the first valve member located at positions outside of the magnetic field and opening into the same quadrants of the divided lumen of the inner tube of the first valve member as the other pair of openings that are also located in the inner tube at a position outside of the magnetic field of the magnet.

33. The refrigeration apparatus of claim 32 wherein the outer tube of the moving second valve member covers all of the pairs of openings in the inner tube of the first valve member at all positions of the moving second valve member, and including seals between the inner and outer tubes adjacent the openings in the inner tube to inhibit the flow of heat transfer fluid from the openings in the inner tube into the space between the inner and outer tubes.

34. The refrigeration apparatus of claim 33 wherein grooves are formed in the outside surface of the inner tube at positions on either side of the openings in the inner tube, and including O-rings mounted in the grooves that seal against the inner surface of the outer tube to provide the seals about each opening to inhibit fluid from flowing from the opening into the space between the inner and outer tubes while allowing the inner and outer tubes to slide with respect to each other.

35. The refrigeration apparatus of claim 34 wherein an indentation is formed about the circumference of the inner tube at the position of each opening in the inner tube so that fluid can flow to or from the opening about the entire circumference of the inner tube within the indentation.

36. The refrigeration apparatus of claim 29 wherein the lumen of the inner tube is divided into four quadrant conduits by straight intersecting walls extending axially through the inner tube and engaged with the cylindrical wall of the inner tube.

37. The refrigeration apparatus of claim 36 wherein the first valve member includes a manifold mounted to an end of the inner tube and having four chambers with each chamber in communication with one of the four quadrant conduits of the divided lumen of the inner tube, and wherein the ports of the first valve member are formed as openings in the manifold leading to the four chambers within the manifold each of which is in communication with one of the quadrant conduits of the divided lumen of the inner tube.

38. The refrigeration apparatus of claim 29 wherein the drive comprises an air cylinder having a shaft extending therefrom which is connected to the outer tube of the moving second valve member, the air cylinder drive operative to move the shaft thereof and the outer tube connected thereto between two positions, one position in which the regenerator bed is out of the magnetic field of the magnet and the other position, in which the regenerator bed is in the magnetic field of the magnet.

39. An active magnetic regenerator apparatus comprising:
 (a) a distribution valve having a first valve member and a moving second valve member slidably engaged to one another, the first valve member and the moving second valve member each having ports by which heat transfer fluid may be provided to and received from the valve member;
 (b) a first regenerator bed and a second regenerator bed each including material that exhibits the magnetocaloric effect that is porous and allows the flow of heat transfer fluid through such magnetocaloric material, the first and second regenerator beds mounted to the moving second valve member such that the two regenerator beds are spaced from each other, the moving second valve member having a port opening into a first side of the first bed and a port opening into a second side of the first bed so that fluid flowing between the ports flows through the magnetocaloric material of the first bed, the moving second valve member also having a port opening into a first side of the second bed and a port opening into a second side of the second bed so that fluid flowing between the ports flows through the magnetocaloric material of the second regenerator bed; and wherein the first valve member is formed as an elongated hollow inner tube having an outside surface and wherein the moving second valve member is formed as an elongated hollow tube having an inside diameter slightly larger than the outside diameter of the inner tube and mounted to slide axially on the inner tube, the inner tube having an inner lumen divided into four quadrants to define four quadrant conduits and including three pairs of openings in the wall of the inner tube, two pairs of equally spaced openings communicating with two of the four quadrant conduits and located at a position outside of the magnetic field of the magnet and a third pair of openings positioned between the other two pairs communicating with the other two quadrant conduits and located at a position within the magnetic field of the magnet, and wherein the regenerator beds are mounted around the outer tube of the moving second valve member and wherein the ports in the moving second valve member communicating with the beds are spaced apart a distance equal to the spacing between the pairs of openings in the inner tube such that in the first position of the distribution valve the ports in the moving second valve member opening into the first bed are in communication with a first two of the quadrant conduits of the inner tube and wherein the ports in the moving second valve member opening into the second bed are in communication with the other two quadrant conduits of the inner tube, and wherein in the second position of the moving second valve member the ports opening into the two beds are in communication with the quadrant conduits that they were not in communication with in the first position.

40. The apparatus of claim 39 wherein the regenerator beds include an outer cylindrical casing and end walls to define an annular enclosure between the walls of the casing, the end walls, and the outer tube of the moving second valve member, the porous magnetocaloric material filling the annular enclosure.

41. The apparatus of claim 40 wherein the two ports in the moving second valve member opening into each bed comprise slots formed through the wall of the outer tube of the moving second valve member at positions adjacent to the end walls of the casing of the regenerator bed.

42. The apparatus of claim 39 wherein the outer tube of the moving second valve member covers all of the pairs of openings in the inner tube of the first valve member at all positions of the moving second valve member, and including seals between the inner and outer tubes adjacent the openings in the inner tube to inhibit the flow of heat transfer fluid from the openings in the inner tube into the space between the inner and outer tubes.

43. The apparatus of claim 42 wherein grooves are formed in the outside surface of the inner tube at positions on either side of the openings in the inner tube, and including O-rings mounted in the grooves that seal against the inner surface of the outer tube to provide the seals about each opening to inhibit fluid from flowing from the opening into the space between the inner and outer tubes while allowing the inner and outer tubes to slide with respect to each other.

44. The apparatus of claim 43 wherein an indentation is formed about the circumference of the inner tube at the position of each opening in the inner tube so that fluid can flow to or from the opening about the entire circumference of the inner tube within the indentation.

45. The apparatus of claim 39 wherein the lumen of the inner tube is divided into four quadrant conduits by straight intersecting walls extending axially through the inner tube and engaged with the cylindrical wall of the inner tube.

46. The apparatus of claim 39 wherein the first valve member includes a manifold mounted to an end of the inner tube and having four chambers with each chamber in communication with one of the four quadrant conduits of the divided lumen of the inner tube, and wherein the ports of the first valve member are formed as openings in the manifold leading to the four chambers within the manifold each of which is in communication with one of the quadrant conduits of the divided lumen of the inner tube.

47. An active magnetic regenerator refrigeration apparatus comprising:

(a) a magnet producing a magnetic field;

(b) a distribution valve having a first valve member and a moving second valve member slidably engaged to one another, the first valve member and the moving second valve member each having ports by which heat transfer fluid may be provided to and received from the valve member;

(c) a magnetic regenerator bed including material that exhibits the magnetocaloric effect that is porous and allows the flow of heat transfer fluid through such magnetocaloric material, the bed mounted to the moving second valve member to move with it, the moving second valve member having a port opening into a first side of the bed and a port opening into a second side of the bed so that fluid flowing between the ports flows through the magnetocaloric material of the bed;

(d) a reciprocating drive connected to the moving second valve member to slide the moving second valve member and the regenerator bed mounted to it between a first position in which the regenerator bed is outside of the magnetic field of the magnet to a second position in which the regenerator bed is in the magnetic field of the magnet;

(e) a hot heat exchanger;

(f) a cold heat exchanger for chilling a fluid;

(g) a pump;

(h) conduits connected to the ports of the first valve member, to the pump and to the hot and cold heat exchangers, the conduits directing a portion of heat transfer fluid in a circuit from the bed which is outside the magnetic field through the distribution valve then out of the distribution valve and back to and through the distribution valve to the bed that is in the magnetic field and then through the distribution valve to the hot heat exchanger and then back through the distribution valve to the bed that is outside of the magnetic field, the conduits also directing a portion of the fluid from the bed which is outside the magnetic field through the distribution valve and then through the cold heat exchanger to an input of the pump and then to the distribution valve, the distribution valve directing the flow therethrough so that the circuit of flow through the conduits is maintained in the same direction in both positions of the distribution valve and with the direction of flow through each bed reversed in each position of the valve, the pump connected in the conduits to drive heat transfer fluid through the hot and cold heat exchangers, the conduits and the distribution valve.

48. The refrigeration apparatus of claim 47 including a solenoid operated valve connected in a conduit leading from the pump and a controller connected to the drive and the solenoid valve to control the drive to switch the distribution valve at selected times and cause the distribution valve to dwell at its first and second positions for selected times, and to control the solenoid valve to block flow of heat transfer fluid from the pump when the distribution valve is being switched between its two positions and to open the solenoid valve to allow flow from the pump when the distribution valve is dwelling in its two positions.

49. The refrigeration apparatus of claim 48 including a solenoid valve connected around the pump and connected to the controller to be controlled to close when the distribution valve is dwelling in its two positions and to open when the distribution valve is being switched between its two positions.

50. The refrigeration apparatus of claim 47 wherein the regenerator bed is a first regenerator bed and including a second regenerator bed including material that exhibits the magnetocaloric effect that is porous and allows the flow of heat transfer fluid through such magnetocaloric material, the second regenerator bed mounted to the moving second valve member such that the two regenerator beds are spaced from each other, the moving second valve member having a port opening into a first side of the second regenerator bed and a port opening into a second side of the second regenerator bed so that fluid flowing between the ports flows through the magnetocaloric material of the second regenerator bed, and wherein the drive moves the moving second valve member between the first position in which the first regenerator bed is outside the magnetic field of the magnet and the second regenerator bed is in the magnetic field of the magnet and a second position in which the first regenerator bed is in the magnetic field of the magnet and the second regenerator bed is outside of the magnetic field of the magnet.

51. The refrigeration apparatus of claim 47 wherein the magnet is formed of a solenoidal winding of superconductor, and including a dewar in which the solenoidal superconducting winding is held to cool the winding, and a central opening in the dewar extending through the solenoidal superconducting winding, the distribution valve and regenerator bed mounted thereto positioned within the opening in the dewar for movement of the moving second valve member by the drive from a position in which the regenerator bed is outside of the magnetic field produced within the solenoidal winding to a position in which the regenerator bed is in the magnetic field of the solenoidal winding.

52. The refrigeration apparatus of claim 47 wherein the first valve member is formed as an elongated hollow inner tube having an outside surface and wherein the moving second valve member is formed as an elongated hollow tube having an inside diameter slightly larger than the outside diameter of the inner tube and mounted to slide axially on the inner tube, the inner tube having an inner lumen divided into four quadrants to define four quadrant conduits and including two pairs of openings in the wall of the inner tube, one pair of openings communicating with two of the four quadrant conduits and located at a position outside of the magnetic field of the magnet and a second pair of openings communicating with the other two quadrant conduits and located at a position within the magnetic field of the magnet, and wherein the regenerator bed is mounted around the outer tube of the moving second valve member and wherein the ports in the moving second valve member are spaced apart a distance equal to the spacing between the pairs of openings in the inner tube such that the two ports in the moving second valve member are in communication with a first two of the quadrant conduits of the inner tube when the valve is in a position with the regenerator bed outside the magnetic field and wherein the ports in the moving second valve member are in communication with the other two quadrant conduits of the inner tube when the valve is in a position with the regenerator bed within the magnetic field of the magnet.

53. The refrigeration apparatus of claim 52 wherein the regenerator bed includes an outer cylindrical casing and end walls to define an annular enclosure between the walls of the casing, the end walls, and the outer tube of the moving second valve member, the porous magnetocaloric material filling the annular enclosure.

54. The refrigeration apparatus of claim 53 wherein the two ports in the moving second valve member comprise slots formed through the wall of the outer tube of the moving second valve member at positions adjacent to the end walls of the casing of the regenerator bed.

55. The refrigeration apparatus of claim 53 wherein there are two regenerator beds having the same construction mounted at spaced positions on the outer tube of the moving second valve member, wherein the drive moves the moving second valve member between a first position in which a first of the beds is in the magnetic field and a second of the beds is outside the magnetic field of the magnet to a second position in which the first of the beds is outside of the magnetic field and the second of the beds is in the magnetic field, and including a third pair of openings in the inner tube of the first valve member located at positions outside of the magnetic field and opening into the same quadrants of the divided lumen of the inner tube of the first valve member as the other pair of openings that are also located in the inner tube at a position outside of the magnetic field of the magnet.

56. The refrigeration apparatus of claim 55 wherein the outer tube of the moving second valve member covers all of the pairs of openings in the inner tube of the first valve member at all positions of the moving second valve member, and including seals between the inner and outer tubes adjacent the openings in the inner tube to inhibit the flow of heat transfer fluid from the openings in the inner tube into the space between the inner and outer tubes, wherein grooves are formed in the outside surface of the inner tube at positions on either side of the openings in the inner tube, and including O-rings mounted in the grooves that seal against the inner surface of the outer tube to provide the seals about each opening to inhibit fluid from flowing from the opening into the space between the inner and outer tubes while allowing the inner and outer tubes to slide with respect to each other.

* * * * *

UNITED STATES PATENT AND TRADEMARK OFFICE
CERTIFICATE OF CORRECTION

PATENT NO. : 5,934,078
DATED : August 10, 1999
INVENTOR(S) : Lewis M. Lawton, Jr.

It is certified that error appears in the above-identified patent and that said Letters Patent is hereby corrected as shown below:

After the title and before the "FIELD OF THE INVENTION" add:

-- STATEMENT OF GOVERNMENT RIGHTS
This invention was made with Government support under Ames subcontract No. SC-94-278 issued by the Department of Energy. The Government has certain rights in this invention. --

Signed and Sealed this

Twenty-third Day of April, 2002

Attest:

JAMES E. ROGAN
Attesting Officer
Director of the United States Patent and Trademark Office